Oct. 4, 1949.  A. L. SIMISON  2,484,003
PARALLEL GLASS FIBER UNIT
Filed Feb. 13, 1943
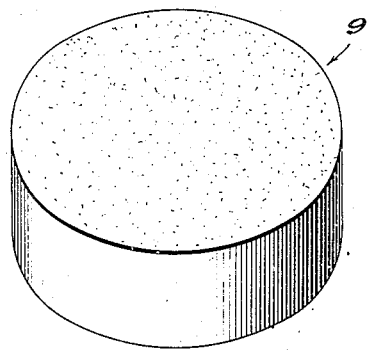
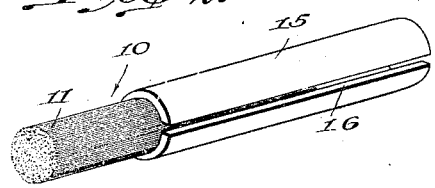
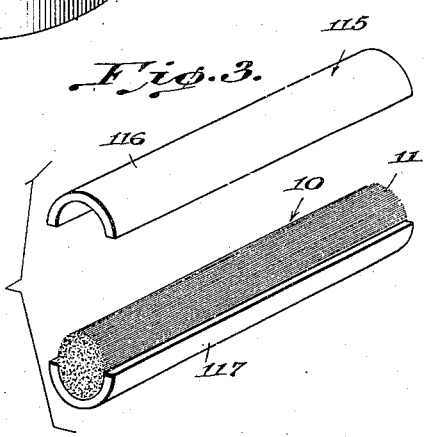
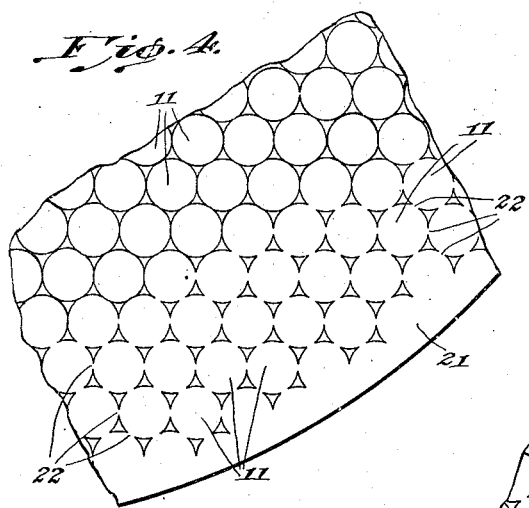
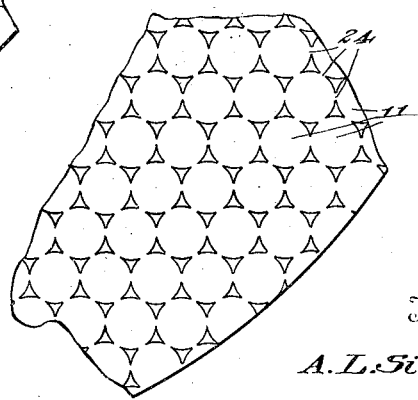
Inventor
A. L. Simison
By Staelin & Overman
Attorneys Patented Oct. 4, 1949

2,484,003

UNITED STATES PATENT OFFICE 2,484,003

PARALLEL GLASS FIBER UNIT

Allen L. Simison, Newark, Ohio, assignor to Owens-Corning Fiberglas Corporation, a corporation of Delaware Application February 13, 1943, Serial No. 475,850

5 Claims. (Cl. 49—82)

This invention relates to parallel glass fiber products and their manufacture, and particularly to the manufacture of parallel glass fiber filters or similar units for purposes other than filtering.

The present application is a continuation-in-part of my co-pending application Serial No. 355,130, filed September 3, 1940, now Patent No. 2,311,704.

In parallel fiber units of the general type shown, for instance, in the Polushkin U. S. Patent No. 1,885,762 and in the Swiss Patent No. 129,574 of 1929, compact arrangement of fibers in parallelism with substantially all of the fibers in longitudinal contact is desired. This arrangement of the fibers provides a multiplicity of substantially uniform spaces between the fibers that form filtrate passages extending lengthwise of the fibers at opposite sides of the lines of longitudinal contact between the fibers.

When the units are to be used as filters they are usually in the form of circular wafers of ⅛ inch to one inch or more in thickness and of a diameter of two to six or more inches and are arranged with the fibers extending substantially normal to the major faces of the wafer. Similar wafers of the same or different sizes may be combined and supported in edge-to-edge relationship to form light diffusing and decorative screens. The units are also adaptable to other uses.

My prior co-pending application discloses and claims a method for arranging glass fibers into a bundle in which the glass fibers extend generally in the direction of length of the bundle. After a bundle of fibers are compacted, the bundle is enclosed in suitable means such as a metal tube or sheath to secure the fibers in compacted relation, and the sheathed bundle is usually cut transversely to its length into a plurality of wafers which form the filtering units. Each of the wafers formed in this way comprises a circular or other shaped body of fagoted glass fibers bound with a band of metal or other material.

In certain applications of the units, the metal band is objectionable, as in the handling of corrosive liquids. The band also is an item of added cost and also detracts from the appearance of the units, which latter is of importance where the units are employed as parts of decorative or light diffusing screens, and other structures of a similar nature.

It is an object of the present invention to provide an all-glass unit of parallel glass fibers held in compact relation without the use of any separate retaining means.

It is a further object of the invention to provide a parallel fiber unit which is a unitary structure as distinguished from the previous units made up of separable fibers and a retaining band separable from the body of fibers.

In attaining these objects, the present invention comprises arranging a multiplicity of glass fibers in a bundle in which the fibers extend in the general direction of length of the bundle and are in compact relation so that the fibers throughout the bundle are in longitudinal contact. While the bundle is retained in the desired degree of compactness, the peripheral portions of the bundle are heated to a temperature sufficient to fuse or partially fuse together the fibers in the peripheral portions and thus retain the fibers throughout the bundle in compact relation. If desired, all portions of the bundle may be heated to a fusing temperature so that the fibers throughout the bundle are sintered together, thereby providing a unitary body which, in effect, is a continuous glass body having a multiplicity of very small, straight passages extending in parallelism therethrough. These characteristics are highly desirable in a filter for liquids.

In the drawings:

Figure 1 is a perspective view of a parallel glass fiber filter unit made in accordance with the present invention;

Figure 2 is a perspective view of a compacted bundle of glass fibers partially inserted in a sheath therefor;

Figure 3 is a perspective view depicting another method of enclosing the bundle of fibers in a sheath;

Figure 4 is a greatly enlarged diagrammatic cross-sectional view of a portion of the unit of the present invention; and Figure 5 is a similar view depicting a modification of the invention.

The units 9 of the present invention may be formed by initially grouping the fibers into a bundle in any suitable manner. The fibers may be taken directly from the drum on which they were wound during attenuation from the molten glass supply, in which case the cylindrical package of fibers on the drum is cut along a line parallel with the drum axis and the package of fibers unwrapped from the drum surface and laid out in a plane. Other methods may be employed such as combing a plurality of haphazardly arranged fibers to form a loose bundle of fibers extending generally lengthwise of the bundle.

This bundle of fibers is compacted to the desired degree by any suitable means to bring the fibers throughout the bundle into closely adjacent relation so that a large number of fibers throughout the bundle are in longitudinal contact. As disclosed in my prior application, this compacting may be done by saturating the bundle with a liquid lubricant and then draining the excess lubricant from the bundle in the direction of its length to cause the fibers to draw together into compact relation. If desired, other methods of compacting the bundle of fibers may be employed within the scope of the present invention.

After the bundle has been compacted or otherwise treated to bring the fibers into the desired close arrangement, it is secured in such relation by binding the bundle with a spirally wrapped metal wire or tape, a glass fiber tape or yarn, or by enclosing the bundle in a metal sheath or tube as shown in Figures 2 and 3. Referring to Figure 2, the bundle 10 of glass fibers 11 is inserted endwise into a tube 15 that is split along one side as at 16 and expanded in cross section. The bundle may have been compacted to any desired degree prior to its insertion into the tube 15, depending upon the amount of compacting to be performed after the bundle is in the tube, and the degree of compactness required in the finished product. The bundle within the split tube is compressed by forcing the tube closed on the bundle and then securing it in closed relation by suitable clamps, by tack welding or by any other suitable methods.

The same results may be obtained by employing a tube 115 split into halves 116, 117 as shown in Figure 3. The bundle 10 of fibers is laid in one half of the tube and the halves of the tube are then clamped together to compress the bundle within the tube. They are then either temporarily or permanently secured together in suitable manner.

While the bundle within the tube is held under compression in compact relation it is heated to a temperature sufficient to cause fusing together of the fibers in the bundle. The tube may be removed after cooling, but, if desired, the tube may be left on the bundle. Where the filter units are to be used for filtering acids or other corrosive liquids it is generally preferable to remove the tube and thus avoid the use of any metal that might be attacked by the liquid being filtered.

The bundle of fibers may be heated by being placed in a muffle furnace, by passing a flame over the outer surface of the tube, by passing an electric current through the tube, or in any other suitable manner. Where it is desired only to fuse together the fibers in the peripheral portions of the bundle, it has been found preferable to heat the tube or other sheath for the bundle to the sintering temperature of the glass fibers by means of a flame directed onto the sheath or by radiant heating. The heat applied to the tube is quickly transferred to the portion of the bundle adjacent the tube or sheath so that the fibers in the peripheral portions of the bundle are quickly brought up to fusing temperature. The heating may be carried to a temperature and continued for a period of time sufficient to cause the fibers in the periphery of the bundle to flow together and form a continuous body of glass surrounding the bundle. The thickness of this body of glass will, of course, depend upon the degree and length of time of heating, as will the extent to which fibers closer to the center of the bundle are fused or partially fused together.

Figure 4 illustrates diagrammatically the manner of the fusing of the fibers at and adjacent the periphery of the unit of parallel glass fibers. The reference numeral 21 indicates the solid, continuous glass body formed by the flowing together of the fibers in the periphery of the unit, and the numeral 22 indicates the points of fusing together of adjacent fibers 11 that are located closer to the center of the unit. There is a gradual transition from the solid glass sheath on the unit or bundle to the fibers that are not fused together, and both the thickness of the solid glass sheath and the extent to which the fibers inwardly thereof are fused together are dependent upon the degree and length of time of heating.

Instead of fusing together the fibers in the peripheral portions of the bundle and melting the fibers about the outer surface of the bundle to form a tube of glass surrounding the bundle as shown in Figure 4, it is also possible to fuse the fibers throughout the entire cross-sectional area of the bundle to an extent sufficient to cause all the fibers to adhere together but insufficient to cause actual flowing of any of the fibers. Units treated in this way are similar in many respects to a continuous body of glass provided with a multiplicity of very small channels extending therethrough.

A unit having the fibers fused together in the latter way is shown diagrammatically in Figure 5, where the numeral 24 indicates the point of fusing between adjacent fibers 11.

If desired, the first method may be combined with the second method and the fibers throughout the cross-sectional area of the bundle all fused together and the fibers at the periphery of the bundle melted and flowed together to provide a smooth continuous surface on the bundle. This may be accomplished most efficiently by heating all portions of the bundle to the fusing temperature and then after the bundle has cooled sufficiently to be handled without danger of separating the fibers, the outer surface of the bundle may be flash fired to cause the fibers at the surface of the bundle to melt and flow together.

After the bundle of fibers has been treated in any of the ways mentioned, it may be cut transversely into a plurality of slabs or wafers of the desired thickness to form units of the form shown in Figure 1. Although it is generally less efficient, a bundle of fibers may be provided with a sheath and divided along transversely extending lines into a number of wafers, and subsequently heat treated by the methods disclosed herein to fuse together all or part of the fibers in the wafers. It is also possible to grind or polish the major faces of the wafers prior to or after heat treatment by using known glass polishing techniques. Polishing of the units may best be done by temporarily filling the pores of the units with a wax, resin, wax-like or resinous material prior to and during polishing as disclosed and claimed in my co-pending application Serial No. 354,852, filed August 30, 1940, now Patent No. 2,328,302, dated August 31, 1943.

The parallel glass fiber units of the present invention are possessed of many advantages when employed as filters, for decorative purposes, or wherever an all-glass light-weight filter or screen is required. Modifications may be made within the spirit of the invention and within the scope of the claims.

I claim:

1. As an article of manufacture, a unit comprising a multiplicity of parallel glass fibers in compact arrangement and under compression with substantially all of the fibers in longitudinal contact, the fibers only in the periphery of the unit being sintered together to form a band surrounding the unit and thereby prevent release of the pressure in the interior of the finished unit.

2. The method of making porous parallel glass fiber units which comprises heating the region adjacent the peripheral surface of a compact bundle of fibers in which the fibers extend generally in the direction of length of the bundle, and holding the bundle under compression while it is heated to a temperature at which the fibers only in the region of said surface are fused together while maintaining the fibers interiorly of said peripheral region below said fusing temperature, whereby said last-named fibers are unfused and held in compacted relation under pressure by the fibers in the surface regions of the bundle.

3. The method of making porous parallel glass fiber units which comprises heating the region adjacent the peripheral surface of a compact bundle of fibers in which the fibers extend generally in the direction of length of the bundle, and holding the bundle under compression while it is heated to a temperature at which the fibers only in the region of said surface are fused together to form a continuous integral shell therearound while maintaining the fibers interiorly of the peripheral region under compression and below said fusing temperature.

4. As an article of manufacture, a porous unit comprising a multiplicity of parallel glass fibers in compact arrangement with substantially all of the fibers in longitudinal contact, the fibers only in the region of the periphery of the unit being fused together while the inner fibers are held under compression in an unfused state to provide the maximum porosity of the unit.

5. As an article of manufacture, a porous unit comprising a multiplicity of parallel glass fibers held under compression in compact arrangement with substantially all of the fibers in longitudinal contact, the fibers only in the peripheral region of the unit being fused together to form a shell of glass surrounding an inner body of unfused fibers.

ALLEN L. SIMISON.

REFERENCES CITED

The following references are of record in the file of this patent:

UNITED STATES PATENTS

| Number | Name | Date |
|---|---|---|
| 2,271,829 | Powers | Feb. 3, 1942 |
| 2,311,704 | Simison | Feb. 23, 1943 |
| 2,328,302 | Simison | Aug. 31, 1943 |

FOREIGN PATENTS

| Number | Country | Date |
|---|---|---|
| 425,413 | Great Britain | Mar. 11, 1935 |